July 26, 1966     A. H. BAHNSON, JR     3,263,102

ELECTRICAL THRUST PRODUCING DEVICE

Original Filed May 12, 1958

INVENTOR.
Agnew H. Bahnson Jr
BY
Pierce, Scheffler & Parker
Attorneys 3,263,102
ELECTRICAL THRUST PRODUCING DEVICE
Agnew H. Bahnson, Jr., Winston-Salem, N.C.; Wachovia Bank and Trust Company, executor of said Agnew H. Bahnson, Jr., deceased
Original application May 12, 1958, Ser. No. 734,494, now Patent No. 2,958,790. Divided and this application June 8, 1960, Ser. No. 34,672
6 Claims. (Cl. 310—5)

This invention relates to a device for producing thrust in response to the application of electrical energy and is a division of my co-pending parent application Serial No. 734,494 filed May 12, 1958, now Patent No. 2,958,790.

In my aforesaid parent application, there is disclosed and claimed an improved arrangement for producing thrust wherein the thrust-producing device is comprised of a pair of main electrodes supported in spaced relationship with each other by means of a dielectric member, and a difference in potential is applied to the electrodes to effect a thrust on the device in the direction of the longitudinal axis of the assembly of support and electrode members.

The present invention is directed to a further organization of elements comprising auxiliary electrodes carried by the dielectric support member and which are so arranged as to produce additional thrust in the longitudinal direction or to effect an asymmetrical distribution of the thrust such as to provide a steering control for the device. In accordance with one embodiment of the invention which will be hereinafter described in detail, three such auxiliary electrodes are used and these are located symmetrically about the longitudinal axis of the device in a common plane transverse to such axis. When all of these auxiliary electrodes are impressed with the same potential, one obtains an augmented thrust in the longitudinal direction of the device. When less than all of the auxiliary electrodes are impressed with this potential, the total thrust on the device becomes asymmetrical relative to the longitudinal axis of the device thus resulting in a canting action which is used to steer the device. At least three of the auxiliary electrodes are required but more than three can be used if desired.

Figure 1:
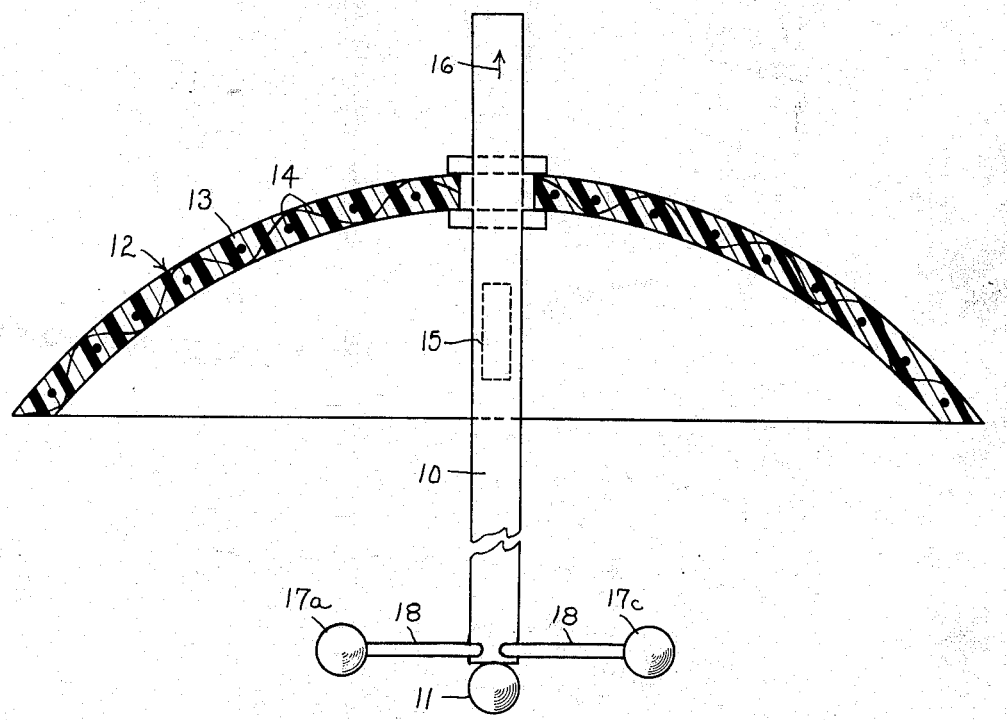
Figure 2:
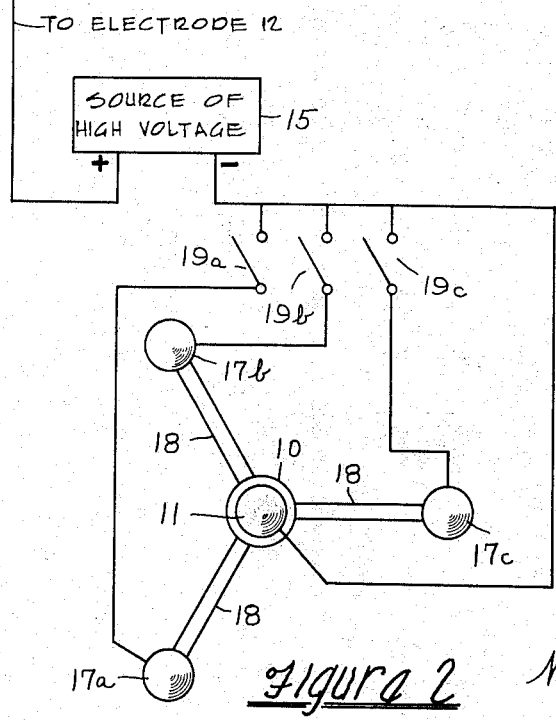

The embodiment which will be described is also illustrated in the accompanying drawings in which:

FIG. 1 is a somewhat diagrammatic view, partly in central section and partly in elevation; and FIG. 2 is a bottom plan view showing the detailed arrangement of the three auxiliary electrodes together with the circuit means for their selective or simultaneous energization.

With reference now to the drawings, a thrust-producing device is depicted which comprises an elongated, rod-like supporting member 10 made from a suitable dielectric material. Mounted on the lower end of the dielectric supporting member 10 is an electrode 11 made of electrically conductive material. Mounted further along the body of the dielectric supporting member 10 is an arcuate electrode 12 in the form of an umbrella-like canopy which surrounds the member 10. The body of the arcuate electrode 12 which has an expanded surface relative to that of electrode 11 can be made from a non-conductive material such as a composition of fiber glass and resin 13 and has conducting material such as electrically conductive wires 14 spaced from each other and embedded in the non-conductive body 13 to extend virtually over the entire surface area thereof.

A source of high direct current voltage indicated schematically at 15, and which is also carried by the support member 10 in a suitable manner, not shown, has its positive (+) terminal connected to the arcuate electrode 12 and its negative (−) terminal connected to electrode 11. The resulting forces which develop as a result of the application of this high direct current potential to electrodes 11 and 12 cause a thrust to be developed on the supporting member 10 longitudinally thereof in the direction of arrow 16.

In accordance with the present invention, the thrust developed in the longitudinal direction of the supporting member 10 may be augmented by the use of an array of auxiliary electrodes arranged about the axis of the supporting member in a common plane transverse to such axis, or this array of auxiliary electrodes can be used to effect a canting action on the supporting member thus effecting a steering of the same in a desired direction.

In one practical embodiment of the invention, as shown in FIG. 2, the array of auxiliary electrodes is comprised of three arcuate surfaces, such as spheres 17a, 17b and 17c of electrically conductive material mounted adjacent that end of the supporting member 10 at which the electrode 11 is located. The spheres 17a–17c are arranged at a uniform radial spacing relative to each other about the longitudinal axis of the supporting member 10, i.e. at a mutual angular spacing of 120° in a common plane transverse to such axis, and are carried by rods 18 of insulating material which extend laterally outward from the lower end of the supporting member 10 also at a mutual angular spacing of 120°. In order to produce the auxiliary thrust, means are provided for selectively energizing the auxiliary electrodes 17a–17c from a source of potential. Conveniently, the potential source 15 can be used for this purpose, and conventional switching means can be employed for the selective energization of the auxiliary electrodes from this source. Each of the auxiliary electrodes, when energized, will have the same potential as that applied to electrode 11, which is negative.

The switching means for each auxiliary electrode, as illustrated, is comprised of a single pole, single throw switch, one terminal of each switch being connected to the negative terminal of the potential source 15 and the other switch terminal being connected to the auxiliary electrode. Thus switch 19a is used to selectively connect auxiliary electrode 17a to the negative terminal of the potential source 15, and in a similar manner, switches 19b and 19c are used to selectively connect auxiliary electrodes 17b and 17c to that source.

If it is desired to use the array of auxiliary electrodes to supplement the thrust produced longitudinally of the supporting member 10 by energization of the two main electrode members 11 and 12, all of the switches 19a–19c are closed thus impressing all of the auxiliary electrodes 17a–17c with the same negative potential as is impressed upon electrode 11. Thus each of the negatively energized auxiliary electrodes in conjunction with the positively energized main electrode 12 produces an additional thrust component, and since all of the auxiliary electrodes are uniformly spaced about the axis of the support member 10, these additional components of thrust act symmetrically on the support member 10 so that the latter is balanced axially and the motion proceeds along its axis.

On the other hand, if it is desired to effect a canting movement of the supporting member 10 in a desired direction for purposes of steering it from the normal direction as represented by arrow 16, the electrodes 17a–17c are selectively energized dependent upon the direction desired. With only one, or possibly two of the auxiliary electrodes 17a–17c energized, the additional component of thrust produced does not act symmetrically on the support member 10 but rather asymmetrically so that the latter will cant in a direction away from the particular auxiliary electrode which is energized.

In conclusion, it is to be understood that while the foregoing embodiment constitutes one practical construction for the thrust producing device, various modifications of the construction and arrangement of component parts are possible within the spirit and scope of the invention as defined in the appended claims.

I claim:

1. A device for producing thrust in response to the application of electrical potentials to the electrodes thereof comprising a support member, a first main electrode mounted on said support member, a second main electrode having an expanded surface with respect to said first main electrode and which is also mounted on said support member in longitudinal spaced relation to said first main electrode, means for applying a high potential between said first and second main electrodes to develop a thrust on said support member longitudinally thereof, at least three auxiliary electrodes carried by said support member, said auxiliary electrodes being disposed symmetrically about the longitudinal axis of said support member, and means for applying a potential between said second main electrode and at least one auxiliary electrode so selected as to develop an auxiliary thrust upon said support member and having a direction which is asymmetrical in relation to the longitudinal axis of said support member.

2. A device for producing thrust in response to the application of electrical potentials to the electrodes thereof comprising a support member, a first main electrode mounted on said support member, a second main electrode having an expanded surface with respect to said first main electrode and which is also mounted on said support member in longitudinal spaced relation to said first main electrode, means for applying a high potential between said first and second main electrodes to develop a thrust on said support member longitudinally thereof, at least three auxiliary electrodes carried by said support member, said auxiliary electrodes being disposed symmetrically about the longitudinal axis of said support member, in a common plane transverse to such axis, and means for applying a potential between said second main electrode and at least one of said auxiliary electrodes so selected as to develop an auxiliary thrust upon said support member and having a direction which is asymmetrical in relation to the longitudinal axis of said support member.

3. A device as defined in claim 2 for producing thrust wherein said auxiliary electrodes are located in the vicinity of said first main electrode.

4. A device as defined in claim 2 for producing thrust wherein said auxiliary electrodes are located in the vicinity of said first main electrode and carry the same potential as said first main electrode.

5. A device as defined in claim 2 for producing thrust wherein said auxiliary electrodes are located in the vicinity of said first main electrode and carry the same potential as said first main electrode, and wherein said means for applying the potential between said second main electrode and said auxiliary electrodes in a selective manner includes means for also applying said potential simultaneously between said second main electrode and all of said auxiliary electrodes.

6. A device for producing thrust in response to the application of electrical potentials to the electrodes thereof comprising an elongated support member, at least three electrodes carried by said support member and disposed laterally of and symmetrically about the longitudinal axis of said support member, a fourth electrode having an expanded surface in relation to said other electrodes mounted symmetrically on said support member in longitudinally spaced relation to said other electrodes, a source of high potential, circuit means connecting one side of said potential source to said fourth electrode and circuit means including selective switching means for selectively connecting one of said other electrodes to the other side of said potential source thereby to develop a thrust upon said support member having a direction which is asymmetrical in relation to the longitudinal axis of said support member.

References Cited by the Examiner

UNITED STATES PATENTS 2,799,990    7/1957    Hausmann.
2,949,550    8/1960    Brown.

MILTON O. HIRSHFIELD, *Primary Examiner.*

ORIS L. RADER, *Examiner.*

J. A. HINKLE, J. W. GIBBS, *Assistant Examiners.*